US008620892B2

United States Patent
Park et al.

(10) Patent No.: US 8,620,892 B2
(45) Date of Patent: Dec. 31, 2013

(54) COLLECTING AND SCORING ONLINE REFERENCES

(75) Inventors: Lemuel S. Park, Cerritos, CA (US); Jimmy Yu, Foster City, CA (US)

(73) Assignee: Brightedge Technologies, Inc., San Mateo, CA (US)

( * ) Notice: Subject to any disclaimer, the term of this patent is extended or adjusted under 35 U.S.C. 154(b) by 0 days.

(21) Appl. No.: 13/458,978

(22) Filed: Apr. 27, 2012

(65) Prior Publication Data

US 2012/0215760 A1 Aug. 23, 2012

Related U.S. Application Data

(63) Continuation of application No. 12/436,704, filed on May 6, 2009, now Pat. No. 8,190,594.

(60) Provisional application No. 61/060,033, filed on Jun. 9, 2008.

(51) Int. Cl.
*G06F 7/00* (2006.01)
*G06F 17/30* (2006.01)

(52) U.S. Cl.
USPC ........... 707/705; 707/706; 707/709; 707/711; 707/736; 707/741

(58) Field of Classification Search
USPC ................ 707/705, 706, 709, 711, 736, 741, 707/999.3, 999.1
See application file for complete search history.

(56) References Cited

U.S. PATENT DOCUMENTS

| | | | |
|---|---|---|---|
| 7,584,194 B2 * | 9/2009 | Tuttle et al. | 707/999.01 |
| 7,788,216 B2 | 8/2010 | Li et al. | |
| 7,801,881 B1 * | 9/2010 | Brawer et al. | 707/709 |
| 7,962,461 B2 * | 6/2011 | Ruhl et al. | 707/706 |
| 2003/0208482 A1 | 11/2003 | Kim et al. | |
| 2005/0223061 A1 * | 10/2005 | Auerbach et al. | 709/206 |
| 2006/0282328 A1 * | 12/2006 | Gerace et al. | 705/14 |
| 2006/0294085 A1 | 12/2006 | Rose et al. | |

(Continued)

FOREIGN PATENT DOCUMENTS

| | | |
|---|---|---|
| EP | 1 182 581 A1 | 2/2002 |
| JP | 2004-070405 A | 3/2004 |
| JP | 2008192157 A | 8/2008 |
| WO | 2007/070199 A1 | 6/2007 |

OTHER PUBLICATIONS

International Search Report and Written Opinion dated Dec. 30, 2009 as issued in International Application No. PCT/US2009/046100 filed Jun. 3, 2009.

(Continued)

*Primary Examiner* — Hares Jami

(57) ABSTRACT

One example embodiment includes a method for indexing online references of an entity. The method includes identifying one or more channels of the Internet to be searched for references to an entity and identifying one or more signals to be evaluated within each of the one or more channels. The method also includes crawling the Internet for online references to the entity, wherein crawling the Internet comprises searching the one or more channels of the Internet for references to the entity and evaluating the one or more signals. The method further includes constructing a reverse index of the references, wherein the reverse index is based on each channel in which a reference is found and the one or more signals evaluated for the reference.

17 Claims, 5 Drawing Sheets

(56) References Cited

U.S. PATENT DOCUMENTS

| | | |
|---|---|---|
| 2007/0198459 A1* | 8/2007 | Boone et al. ............ 707/1 |
| 2007/0203891 A1 | 8/2007 | Solaro et al. |
| 2007/0233649 A1 | 10/2007 | Wang et al. |
| 2008/0040342 A1 | 2/2008 | Hust et al. |
| 2008/0065611 A1* | 3/2008 | Hepworth et al. ............ 707/3 |
| 2008/0071766 A1* | 3/2008 | Grieselhuber et al. ............ 707/5 |
| 2008/0189274 A1* | 8/2008 | Mann ............ 707/5 |
| 2008/0201324 A1* | 8/2008 | Aronowich et al. ............ 707/5 |
| 2008/0270158 A1 | 10/2008 | Abhyanker |
| 2009/0037393 A1 | 2/2009 | Fredricksen et al. |
| 2009/0164431 A1 | 6/2009 | Zivkovic et al. |
| 2009/0222404 A1 | 9/2009 | Dolin et al. |
| 2009/0287684 A1* | 11/2009 | Bennett ............ 707/5 |
| 2010/0070485 A1 | 3/2010 | Parsons et al. |

OTHER PUBLICATIONS

Extended European Search Report dated Aug. 26, 2011 as received in EP Application No. 09763298.8.

* cited by examiner

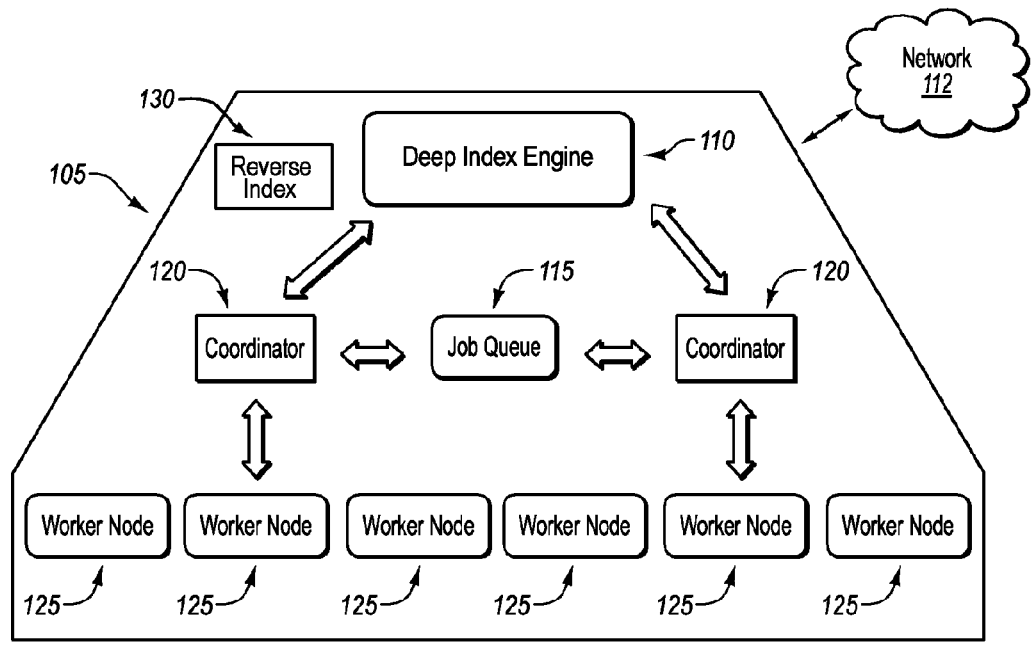
*Figure 1*
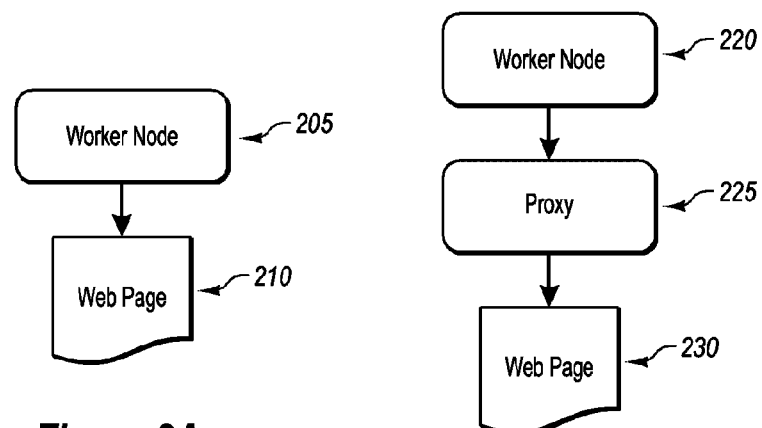
*Figure 2A*
*Figure 2B*

COLLECTING AND SCORING ONLINE REFERENCES

CROSS-REFERENCE TO RELATED APPLICATIONS

This patent application is a continuation of U.S. patent application Ser. No. 12/436,704, filed May 6, 2009, which claims priority to U.S. Provisional Patent Application Ser. No. 61/060,033, filed on Jun. 9, 2008. The foregoing applications are incorporated herein by reference,

BACKGROUND OF THE INVENTION

Search engine optimization, in general, is a process webmasters apply to improve the volume and quality of traffic to a given Web Page or other Internet site. Typical techniques include keywords in title tags, keywords in meta tags, keywords in body text, anchor text in inbound links, age of site, site structure, link popularity in a site's internal link structure, amount of indexable text/page content, number of links to a site, popularity/relevance of links to site and topical relevance of inbound link tags. Additional techniques are sometimes employed based on the search engine for which the webmaster is attempting to optimize. Since search engine algorithms and metrics are proprietary, search engine optimization techniques are widely used to improve visibility of a Web Page or other Internet site on search engine result pages.

Search engine marketing is a form of Internet marketing that includes search engine optimization (SEO), paid inclusion, and paid placement. Paid inclusion and paid placement are forms of paid Internet advertising that place advertisements on the result page of a particular keyword search. Paid inclusion and paid placement vary in price based on factors such as keyword or search term.

Online advertising is a form of advertising that leverages the Internet or World Wide Web to convey a message. Online advertisements include text advertisements, banner advertisements, skyscraper advertisements, floating advertisements, expanding advertisements, polite advertisements, wallpaper advertisements, trick banner advertisements, pop-up advertisements, pop-under advertisements, video advertisements, map advertisements, mobile advertisements and many other forms of online advertisement.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In general, example embodiments of the invention relate to collecting and scoring online references of an entity. One example embodiment includes a method for indexing online references of an entity. The method includes identifying one or more channels of the Internet to be searched for references to an entity and identifying one or more signals to be evaluated within each of the one or more channels. The method also includes crawling the Internet for online references to the entity, wherein crawling the Internet comprises searching the one or more channels of the Internet for references to the entity and evaluating the one or more signals. The method further includes constructing a reverse index of the references, wherein the reverse index is based on each channel in which a reference is found and the one or more signals evaluated for the reference.

Another example embodiment includes a system for indexing online references of an entity. The system includes a deep index engine, wherein the deep index engine is configured to assemble parameters for crawling the Internet and to insert crawls to be performed into a job queue. The system also includes one or more worker nodes, wherein the worker nodes are configured to perform the Internet crawls assembled by the deep index engine. The system further includes one or more coordinators, wherein the coordinators are configured to launch jobs for the one or more worker nodes from the job queue.

These and other aspects of example embodiments of the invention will become more fully apparent from the following description and appended claims.

BRIEF DESCRIPTION OF THE DRAWINGS

To further clarify various aspects of some embodiments of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1 illustrates an embodiment of an example system for indexing online references of an entity;

FIGS. 2A-2C illustrate various configurations of worker nodes that can be employed in the system of FIG. 1;

DETAILED DESCRIPTION OF EXAMPLE EMBODIMENTS

Figure 2C:
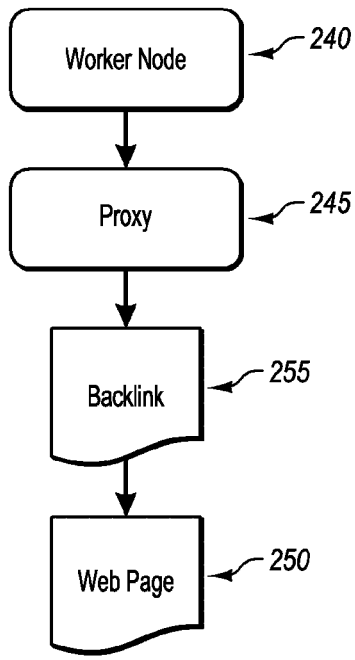

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Reference is first made to FIG. 1, which illustrates an embodiment of a system 105 for indexing online references of an entity. The entities whose online references are indexed can include individuals, corporations, brands, products, models or any other entities referenced anywhere on the Internet. References can include organic references, online advertisements, news items or any other reference to the entity. In particular, the system 105 can be used to identify online references of an entity where both the type of online reference and the entity are identified based on a customer's request. For example, in response to receiving a request from a customer to index online advertisements of a competitor, the system 105 can be used to perform the index.

The network 112 exemplarily includes the Internet, comprising a global internetwork formed by logical and physical connections between multiple wide area networks and/or local area networks and can optionally include the World Wide Web ("Web"), comprising a system of interlinked hypertext documents accessed via the Internet. Alternately or additionally, the network 112 includes one or more cellular RF networks and/or one or more wired and/or wireless networks such as, but not limited to, 802.xx networks, Bluetooth access points, wireless access points, IP-based networks, or the like. The network 112 also includes servers that enable one type of network to interface with another type of network.

The parameters assembled by the deep index engine 110 can include one or more channels. These channels are the particular media within the Internet/network 112 that is to be searched. In some embodiments, channels can include organic searches, page searches, linked advertisement networks, banner advertisements, contextual advertisements, e-mail, blogs, social networks, social news, affiliate marketing, mobile advertisements, media advertisements, video advertisements, discussion forums, news sites, rich media, social bookmarks, paid searches and in-game advertisements. Nevertheless, the channels are not limited to those mentioned but can include any relevant areas of the Internet to be searched, whether now existing or created in the future.

Organic searches refer to those listings in search engine result pages that appear by virtue of their relevance to the search terms, as opposed to their being advertisements. Page searches refer to the listings in search engine result pages regardless of the reason for appearing. Linked advertisement networks are advertisements that are automatically inserted into Web Pages if they contain relevant subject matter. Banner advertisements are advertisements that are placed on a particular Web Page in a particular location. Contextual advertisements are advertisements that are placed when certain key words or other identifiers are present, e.g., keyword advertisements. E-mail—electronic mail or email—is any method of creating, transmitting, or storing primarily text-based human communications with digital communications systems. Blogs—weblogs—are a type of Web Page, usually maintained by an individual with regular entries of commentary, descriptions of events, or other material such as graphics or video. Social networks are a social structure made of nodes (which are generally individuals or organizations) that are tied by one or more specific types of interdependency, such as values, visions, ideas, financial exchange, friendship, kinship, dislike, conflict or trade. Social news refers to Web Pages where users submit and vote on news stories or other links, thus determining which links are presented. Affiliate marketing includes using a Web Page to drive traffic to a different Web Page maintained by an affiliate of the first Web Page's owner. Mobile advertisements include personalized advertisements presented on wireless devices. Media advertisements include advertisements placed within a type of media, or means of communication, whether online, in print, in video or any other format. Video advertisements are advertisements presented in video format. Discussion forums—or message boards—are online discussion sites featuring user-generated content. News sites are Web Pages with the primary purpose of reporting news, including both general news and subject-specific news. Rich media—or interactive media—is media that allows for active participation by the recipient. Social bookmarks relate to a method for network users to store, organize, search, and manage bookmarks of Web Pages on the network and save the bookmarks privately, share the bookmarks with the general public, share the bookmarks with specified people or groups, share the bookmarks within certain networks or share the network with any other combination of private and public access. Paid searches are a type of contextual advertising where Web site owners pay an advertising fee, usually based on click-throughs or ad views, to have their Web Site search results shown in top placement on search engine result pages. In-game advertisements are advertisements placed within a video game either online or on a game console.

Returning to FIG. 1, the parameters assembled by the deep index engine 110 can also include one or more signals to be evaluated. The signals include information about the references to the entity. For example, advertisements placed at the top of a Web Page are much more visible, and therefore, are generally more expensive and are considered more effective than advertisements placed at the bottom of a Web Page. Therefore, if the references to be indexed include online advertisements, advertisement placement is a signal that can be identified for the indexing. Alternately or additionally, signals to be evaluated can include one or more of: frequency of the reference on a given Web Page, location of the reference on the Web Page, calendar date of the crawl, calendar date of Web Page posting, time of day of the crawl, time of day of Web Page posting, context-driven Web indexing, time to download the Web Page, Web browser compatibility of the Web Page, Web plug-in compatibility of the Web Page, or the like. Additionally or alternatively, signals within an e-mail message to be evaluated can include frequency of the e-mail message received, outbound links on the e-mail message, calendar date of the e-mail message received, time of day of the e-mail message received, or the like. The context-driven Web indexing signal can further include links within the Web Page and/or current events surrounding the posting and the topic of the Web Page. Nevertheless, the signals to be evaluated are not limited to those mentioned but can include any relevant information about the references to the entity, whether now existing or created in the future. It should also be noted that "Web Page" as used herein refers to any online posting, including domains, subdomains, Web posts, Uniform Resource Identifiers ("URIs"), Uniform Resource Locators ("URLs") and non-permanent postings such as e-mail and chat unless otherwise specified.

With continued reference to FIG. 1, the deep index engine 110 creates, defines and/or identifies jobs and inserts the jobs, including, for search jobs, the assembled parameters of each search job, into a job queue 115. Insertion into the job queue 115 may be through direct insertion or by sending the job through a coordinator 120 or through any other method by which the job is sent from the deep index engine 110 to the job queue 115. In some embodiments, the job queue 115 maintains the jobs that are to be performed and provides the jobs to worker nodes 125 for execution.

Jobs in the job queue 115 include, but are not limited to, search jobs, e.g., crawling the Internet. In some embodiments, once the Internet has been crawled data is obtained. In general, data refers to any information that the deep index engine has specified as relevant. In some embodiments, data can include information regarding the channels searched and the signals evaluated. In other embodiments, data can include downloading the Web Page for further processing, as discussed below. In further embodiments, data can include search results to be parsed, as discussed below.

In some embodiments, once data has been obtained, it must be processed. The deep index engine 110 can insert such processing jobs into the job queue 115. In some embodiments, processing the data can include evaluating the signals. In other embodiments, processing the data can include parsing search results, as discussed below. In further embodiments, processing can include evaluating the reference for positive or negative connotations. For example, a blog entry about a product can be processed to determine whether the entry is generally positive or negative in regards to the product.

In other embodiments, once the data has been obtained, the data may need to be compressed, which is another job that can be inserted by the deep index engine 110 into the job queue 115. In some embodiments, compressing the data can include saving the data for later processing. In other embodiments, compressing the data can include parsing the Web Page for the relevant signals and saving only the portion of the Web Page which relates to the relevant signals. It will be appreciated, with the benefit of the present disclosure, that the deep index engine 110 may insert any job that needs to be performed, including collecting and/or processing data, into the job queue 115.

In some embodiments, the system 105 includes worker nodes 125. Worker nodes 125 comprise nodes that perform the jobs that have been inserted by the deep index engine 110 into the job queue 115. In some embodiments, jobs performed by the worker nodes 125 include: crawling the Web and performing the relevant search, compressing the data, processing the data, constructing a reverse index, calculating a search engine optimization score or any other job that has been inserted into the job queue 115. In some embodiments, every worker node 125 can be a general worker node that is configured to perform any job inserted into the job queue 115. In other embodiments, worker nodes 125 can be specialized worker nodes that are each configured to perform a single job. In further embodiments, worker nodes 125 can be any combination of general worker nodes and specialized worker nodes.

In some embodiments, the worker nodes 125 are further configured to simulate the activities of a human user of the Internet. In some embodiments, simulating the activities of a human user of the internet includes mimicking and/or providing one or more attributes typically associated with a human user, including one or more of: a geographic location, a particular time of browsing, an age, an income level, an e-mail address, or other demographics of human users. For example, the worker nodes 125 can be configured to connect to the Internet through multiple Internet service providers to simulate human users of the Internet in different geographic locations. Alternately or additionally, the worker nodes 125 can be configured to connect to the Internet at a particular time of day. Alternately or additionally, the worker nodes 125 can be configured to input, in certain websites, an age, income level, or the like, corresponding to a particular demographic of human users. Alternately or additionally, the worker nodes 125 can be configured to input, in certain websites, an e-mail address. In some embodiments of the invention, simulating the activities of a human user of the Internet allows for more relevant search results as the search references concern how such references would be presented to a user of the Internet.

FIG. 2A illustrates one example configuration of a worker node 205 crawling the Internet in the performance of a search job, for instance. The worker node 205 connects directly to a Web Page 210. The worker node 205 may then perform a search for online references to an entity within the Web Page 210 and/or within additional Web Pages by looking through the appropriate channels. In some embodiments, the worker node 205 may also locate and/or evaluate the appropriate signals to obtain signal information, as directed within the search job by the deep index engine 110 of FIG. 1, outlined above, for later evaluation. In this and other embodiments, the worker node 205 may evaluate the appropriate signals while connected to the Web Page 210.

FIG. 2B illustrates another example of a worker node 220 crawling the Internet in the performance of a search job. In this example, the worker node 220 uses a proxy 225 to connect to a Web Page 230. In computer networks, a proxy is a server (e.g., a computer system or an application program), that acts as a go-between for requests from clients seeking resources from other servers. A client connects to the proxy, requesting some service, such as a file, connection, Web Page, or other resource, available from a different server. In some embodiments, a worker node 220 connecting to a Web Page 230 through a proxy 225 may allow the worker node 220 to appear to be from a different geographic origin than it is actually from.

FIG. 2C illustrates yet another example of a worker node 240 crawling the Internet in the performance of a search job. In this example, the worker node 240 connects to the Internet through a proxy 245 and locates a Web Page 250 through a backlink 255. Backlinks 255 are incoming links to a Web site or Web Page 250. The backlinks 255 of a Web Page 250 may be of significant personal, cultural or semantic interest because they can indicate who is paying attention to that Web Page 250. A backlink 255 can include any link to a Web Page 250 from another Web Page. Backlinks 255 are also known as incoming links, inbound links, inlinks, and inward links. Backlinks 255 are sometimes used as a measure of the popularity of Web Page 250 and several search engines provide backlink 255 information of Web Pages 250. In some embodiments, the backlinks 255 are used to help find online references of an entity or otherwise evaluate the references.

Returning to FIG. 1, in some embodiments, the system 105 also includes one or more coordinators 120. The coordinators 120 can receive jobs from the deep index engine 110 and insert them into the job queue 115 as described above. The coordinators 120 can also remove jobs from the job queue 115 and provide them to the worker nodes 125 as needed for completion of the jobs. The coordinators 120 can also track which jobs are being performed by which worker nodes 125 to optimize the performance of the worker nodes 125 (e.g., to make sure that specialized nodes have the work available after finishing their current task).

The modules, or individual components, of the system 105, including the deep index engine 110, the job queue 115, the worker nodes 125 and the coordinators 120, can be implemented in hardware, software or any combination thereof. If implemented in software, the modules of the system 105 are stored in a computer-readable medium, to be accessed as needed to perform their functions. Additionally, if implemented in software, the tasks assigned to each module can be carried out by a processor, field-programmable gate array (FPGA) or any other logic device capable of carrying out software instructions or other logic functions.

Figure 3:
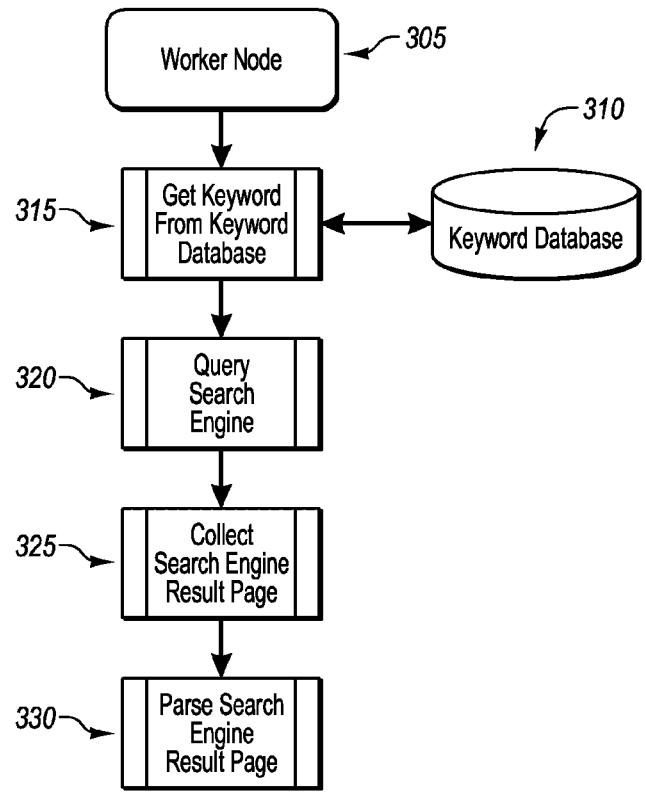
FIG. 3 illustrates aspects of a method of using a page search to find appropriate Web Pages to be searched for online references.

FIG. 3 illustrates aspects of a method of using a page search to find appropriate Web Pages to be searched for online references. The method of FIG. 3 can be performed by a worker node 305 in conjunction with a keyword database 310. The keyword database 310 contains one or more keywords to be used in the page search. In some embodiments, the deep index engine 110 of FIG. 1 can compile the keyword database 310. In other embodiments, the worker nodes 125 of FIG. 1 can, prior to the page search, compile the keyword database 310.

Returning to FIG. 3, the worker node 305 obtains 315 a keyword from the keyword database 310. The worker node 305 then queries 320 a search engine for a page search. The search engine can be any public or private search engine used to perform searches, whether now existing or created in the future. Multiple search engines can be used for each keyword to compile results or individual search engines can be used as preferred for each entity.

Once the search is performed, the worker node 305 collects 325 the search engine result page. The result page can be collected 325 as text to be processed by the worker node 305 or to be inserted into the job queue for processing by other worker nodes. The search engine result page can also be collected 325 in the original format or only the links themselves preserved with the links inserted into the job queue for additional Web crawls by the worker nodes. Nevertheless, any method that collects the search engine result page, either now existing or created in the future, is contemplated for collecting the search engine result page 325.

After the search engine result page is collected, the search engine result page is parsed 330 for relevant information. The result page can be parsed 330 by worker node 305 or can be inserted into a job queue for parsing by other worker nodes. The information that is considered relevant can be determined by the parameters assembled previously by the deep index engine 110 of FIG. 1. For example, if so desired, only organic search results can be considered. Alternatively, only paid results may be considered if the online references are limited to paid advertisements within search engines. In some embodiments, the rank of the search result may be relevant to the indexing, whereas in other embodiments the rank may be of little or no relevance to the indexing.

Figure 4:
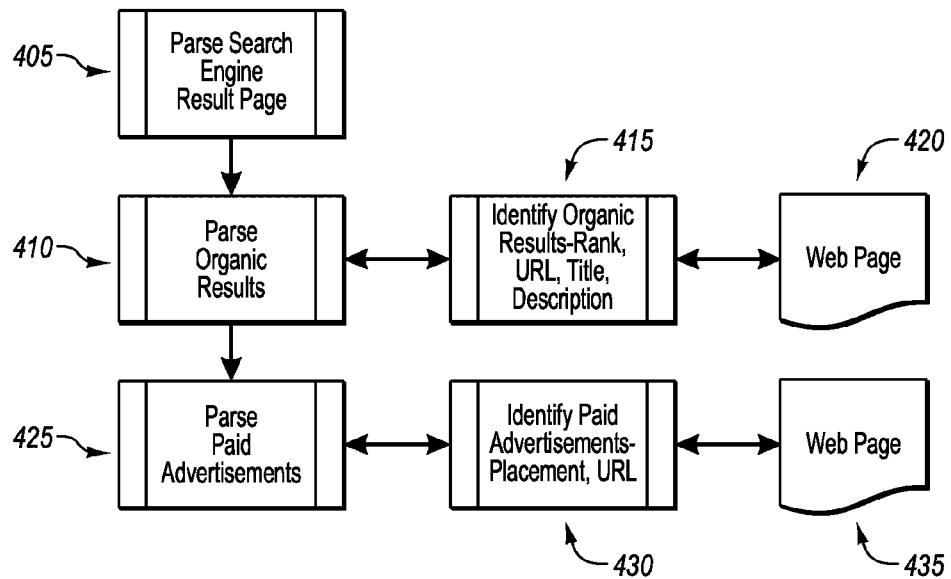
FIG. 4 illustrates aspects of a method of parsing a search engine result page.

FIG. 4 illustrates aspects of a method of parsing a search engine result page for references to an entity, such as a search engine result page obtained from a keyword search as illustrated in FIG. 3. In some embodiments, the method of FIG. 4 is performed by one or more worker nodes.

The method of FIG. 4 begins by parsing 405 the search engine result page into one or more channel-related groupings, such as organic results and paid advertisements. For the purposes of this example, organic results and paid advertisements are treated differently, although in other embodiments they may be treated the same or differently. The worker node parses 410 the organic results to identify 415 one or more signals in the organic results of the search engine result page that refer to the entity, the one or more signals including, for example, rank, URL, title and/or description of a corresponding search engine result that refers to the entity. These signals can help identify the relevance of a search engine result as well as help identify one or more Web Pages 420 to be searched in the future. The Web Pages 420 can then be parsed for references to the entity.

The worker node can also parse 425 the paid advertisement results to identify 430 one or more signals in the paid advertisement results of the search engine result page that refer to the entity, the one or more signals including, for example, placement and/or URL of a corresponding paid advertisement in the search engine result page that refers to the entity. Prominent placement is often considered more effective and, therefore, will normally cost more, than less prominent placement of a paid advertisement. Therefore, placement of the paid advertisement within a search engine result page and/or other Web Page gives an indication of how much was paid for an advertisement and the relevance that is placed on the correlation between the keyword searched and the marketer placing the advertisement. As with the organic search results, a Web Page 435 pointed to by a paid advertisement can be identified and itself parsed for additional references to the entity.

With combined reference to FIGS. 3 and 4, it is noted that, in this example, the same worker node that performs the search need not visit the Web Page that is ultimately searched for online references. For example, one worker node can obtain 315 a keyword from the keyword database 310, query 320 the search engine and collect 325 the results. A second worker node can parse 330, 405 the result page, identifying 410, 425 which results are organic and which results are paid. A third worker node can identify 415 the appropriate signals of the organic results while a forth worker node can identify 430 the appropriate signals of the paid results. The Web Pages 420, 435 can then be inserted into the job queue for crawling by additional worker nodes. In other embodiments, fewer or more than four worker nodes can be employed to perform the steps of FIGS. 3 and 4.

Returning to FIG. 1, once the system 105 has completed the search for the online references, the system can present the results to a user. In some embodiments, a reverse index 130 can be created that lists the online references to the entity and ranks them according to a set of criteria, such as cost-effectiveness, visibility, or any other criteria. When a search engine tabulates all documents that contain a given word, that is called a reverse index. This is in contrast to a regular index, which contains the locations of all words within a document.

In other embodiments, the results can be presented as raw data. For example, the results could be presented as the number of hits on a particular Web Page, i.e., the traffic history of the Web Page, or as the organic search result rank for a particular keyword or set of keywords. In further embodiments, the results can be presented as mentions in a particular media. For example, the results can be presented as the number of mentions within blogs. Alternately or additionally, the results can be further broken down. For example, blog mentions can be broken down into positive mentions and negative mentions.

Figure 5:
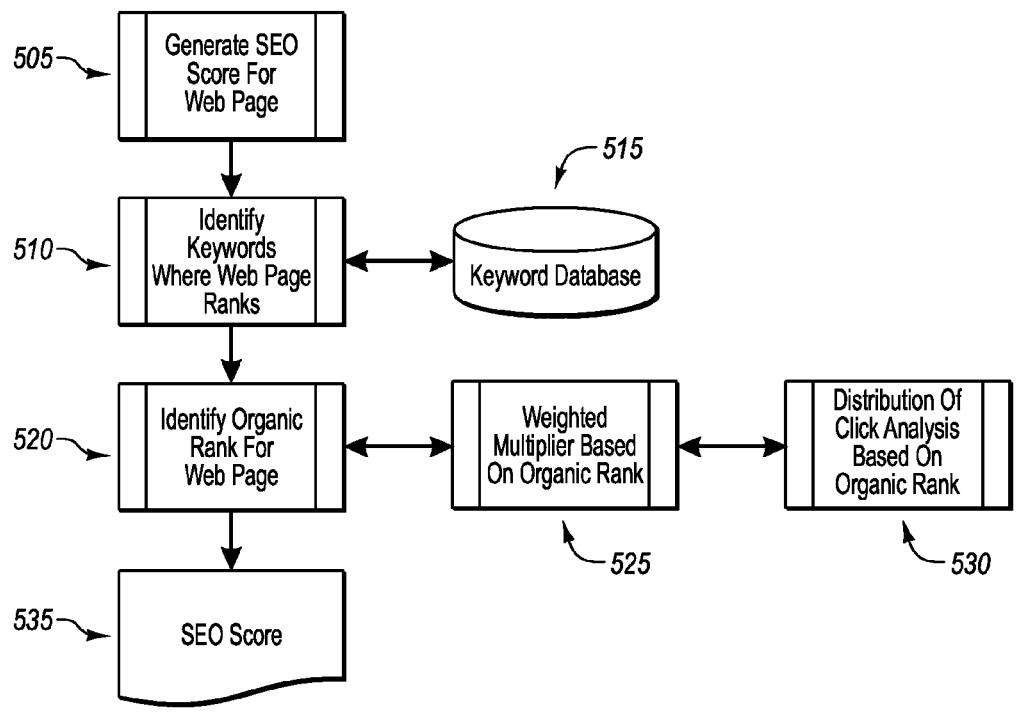
FIG. 5 illustrates an example of a method for presenting results within a reverse index.

FIG. 5 illustrates one example of a method for presenting the results within a reverse index. In this example, the results have a search engine optimization (SEO) score generated 505 for a Web Page that has been crawled. In other words, the results are presented based on some predefined criteria, such as placement within search engine results. The search engine results can include organic searches, paid searches or both. Additionally, the SEO score can be factored to weigh more heavily search results from a particular search engine. For example, high placement in the results of a more popular search engine can influence the SEO score more than the results of a less popular search engine.

Alternatively or additionally, a reverse index generated according to the method of FIG. 5 can include an advertisement score. In some embodiments, the advertisement score can be used to indicate the cost-effectiveness of an advertisement. For example, if a first advertisement generates 50% of the traffic of a second advertisement, but the first advertisement costs only 10% to run compared to the second advertisement, it may be given a higher advertisement score to indicate that it is more cost-effective in generating traffic.

The method of FIG. 5 further includes identifying 510 keywords where the Web Page ranks—i.e., keywords that return the Web Page when searched. In some embodiments, identifying 510 keywords where the Web Page ranks can be done by obtaining possible keywords from a keyword database 515 and performing a search on the keywords. In other embodiments, the keywords can be keywords of interest and the results of the keyword search can have SEO scores generated. In further embodiments, the keyword database can be compiled in any other way that is desired to optimize the indexing.

Once the keyword(s) has been searched, the organic rank for the Web Page is identified 520. A weighted multiplier is then applied 525 to the organic rank, where the weighted multiplier can be based on the organic rank. That is, the weighted multiplier is different for each ranking (i.e., not a constant). In some embodiments, the weighted multiplier considers 530 the distribution of click analysis of the organic rank. That is, the multiplier takes into account the number of users that follow the link to the URL. For example, a search may turn up a result that is irrelevant to the majority of users for whatever reason. Even if the ranking of the result is high, the multiplier can be adjusted to reflect the low number of users who follow the link. From the weighted multiplier and the organic rank, an SEO score can be generated 535. The SEO score allows an analysis of the relevance of the references based on the predefined criteria.

Figure 6A:
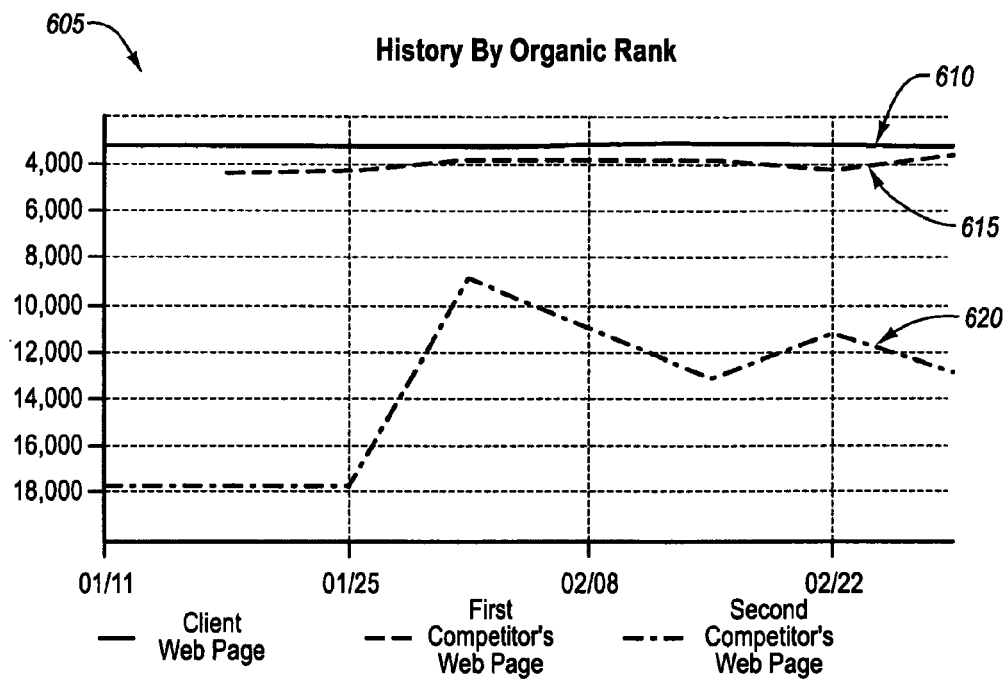
FIGS. 6A-6C illustrate various examples of presenting results to a user.

FIG. 6A illustrates an example of presenting results to a user. In this example, the results are presented in the form of a chart 615. The chart 615 can be produced, for example, at the request of a client who wishes to see how organic rank has changed over time both of his own Web Page, and the Web Pages of his competitors. The chart 615 has multiple lines representing the organic rank of different Web Pages. The first line 610 represents organic rank of the client's Web Page and the changes in organic rank over one week intervals. The second line 615 represents organic rank of a first competitor's Web Page and the changes in organic rank over one week intervals. The third line 620 represents organic rank of a second competitor's Web Page and the changes in organic rank over one week intervals.

In some embodiments, the chart 615 can be limited to the organic rank history of the client. In other embodiments, the chart 615 can be limited to the organic rank history of competitors and can exclude the organic rank history of the client. The chart 615 can include the organic rank history of more or less than two competitors, as specified by the client. Additionally, competitors can be identified in any manner. For example, only the largest competitors could be shown or certain competitors could be identified which are of particular interest.

Figure 6B:
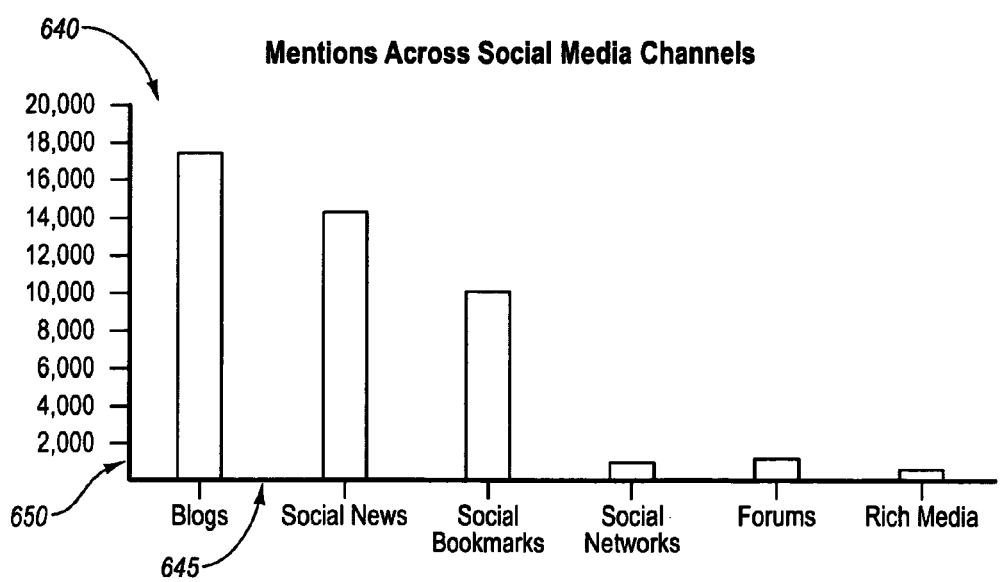

FIG. 6B illustrates an additional example of presenting results to a user. The chart 640 of FIG. 6B presents mentions of a Web Page in social media channels. Mentions can include various references to a Web Page, product or any other entity. The x-axis 645 of the chart 640 includes the channels searched. The y-axis 650 of the chart 640 indicates the number of mentions discovered by the system. In some embodiments, number of mentions can include the absolute number of mentions. In other embodiments, number of mentions can be a relative number of mentions. For example, the number of mentions for a Web Page can be compared to the number of mentions of a competitor's Web Page.

Figure 6C:
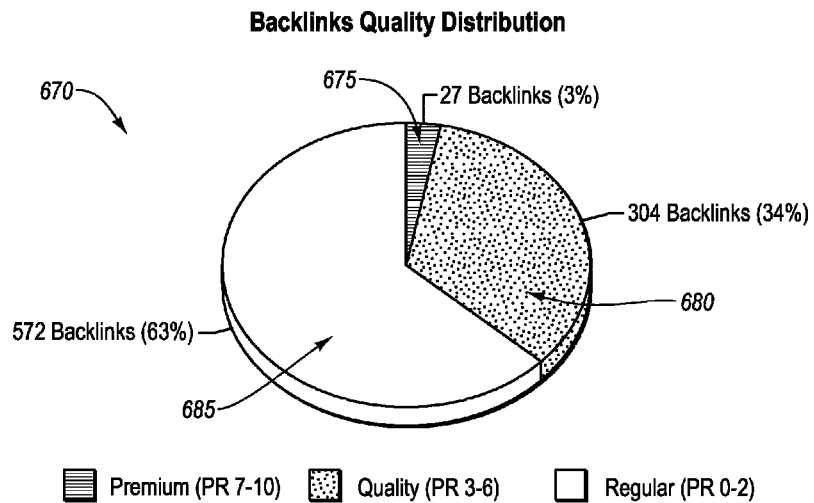

FIG. 6C illustrates another example of presenting results to a user. The chart 670 of FIG. 6C is a pie chart presenting to the user the quality of the backlinks to their Web Page. In some embodiments, quality can be determined using a pagerank value (0 to 10). Pagerank is a link analysis algorithm that assigns a numerical weighting to each element of a hyperlinked set of documents, such as the Web, with the purpose of measuring each element's relative importance within the set. In some embodiments, it is more beneficial to have an inbound link (backlink) from a single (or few) domain(s) with a high pagerank value of 6 or higher than it is to have hundreds of backlinks from domains with lower pagerank values of 0 and 1.

The first region 675 of the chart 670 indicates premium backlinks, or backlinks from Web Pages with a pagerank value of 7 to 10. The second region 680 of the chart 670 indicates quality backlinks, or backlinks from Web Pages with a pagerank value of 3 to 6. The third region 685 of the chart 670 indicates regular backlinks, or backlinks from Web Pages with a pagerank value of 0 to 2. Quality of backlinks can be evaluated using other methods and is not limited to pagerank.

It is appreciated that the charts of FIGS. 6A-6C are merely examples of charts that can be generated to present results to a user according to some embodiments of the invention. Indeed, results can be presented to users by generating other types of charts, or without generating any charts at all.

Figure 7:
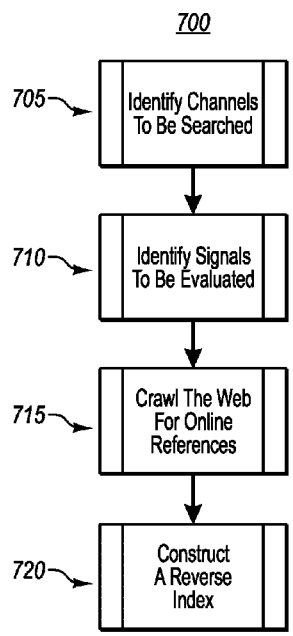
FIG. 7 illustrates a flow chart of an example method for indexing online references of an entity.

With additional reference to FIG. 7, an example method 700 is disclosed for indexing online references of an entity. Entities whose online references are indexed can include individuals, corporations, brands, products, models or any other entities referenced anywhere on the Internet. References can include organic references, online advertisements, news items or any other reference to the entity. In particular, the method 700 can be used to identify online references of an entity where both the type of online reference and the entity are identified based on a customer's request. For example, a customer can request indexing of online advertisements of a competitor and the method 700 can be used to perform the index. Alternately or additionally, the method 700 can be used to identify online references of an entity where one or both of the type of online reference or the entity is identified other than by customer request.

The method 700 includes identifying 705 the channel or channels to be searched. As explained above, channels are the particular medium within the Internet that is to be searched. In some embodiments, channels can include organic searches, page searches, linked advertisement networks, banner advertisements, contextual advertisements, e-mail, blogs, social networks, social news, affiliate marketing, mobile advertisements, media advertisements, video advertisements, discussion forums, news sites, rich media, social bookmarks, paid searches and in-game advertisements. Nevertheless, the channels are not limited to those mentioned but can include any relevant areas of the Internet to be searched, whether now existing or created in the future.

The method 700 further includes identifying 710 signals to be evaluated. The signals include relevant information about the references to the entity. For example, advertisements placed at the top of a Web Page are much more visible, and therefore, are generally more expensive and are considered more effective. Therefore, if the references to be indexed include online advertisements, advertisement placement is a signal that can be identified for the indexing. Signals to be evaluated can alternately or additionally include frequency of the reference on a given Web Page, location of the reference on the Web Page, calendar date of the crawl, calendar date of Web Page posting, time of day of the crawl, time of day of Web Page posting, context-driven Web indexing, time to download the Web Page, Web browser compatibility of the Web Page, Web plug-in compatibility of the Web Page, or the like. Additionally or alternatively, signals within an e-mail message to be evaluated can include frequency of the e-mail message received, outbound links on the e-mail message, calendar date of the e-mail message received, time of day of the e-mail message received, or the like. Context-driven Web indexing can further include links within the Web Page, current events surrounding the posting and the topic of the Web Page. Nevertheless, the signals to be evaluated are not limited to those mentioned but can include any relevant information about the references to the entity, whether now existing or created in the future.

The method 700 also includes crawling 715 the Web, the Internet, or other network, such as the network 112 of FIG. 1, for online references to the entity. Crawling 715 the Web/Internet/network 112 may be via direct connection to a Web Page, may include the use of proxy servers, may use backlinks to identify an appropriate Web Page or can include any other method of locating and evaluating Web Pages. Crawling 715 the Web/Internet/network 112 may also include simulating the activities of a human user of the Internet. For example, crawling 715 the Web can be done through multiple Internet service providers to simulate human users of the Internet in different geographic locations. Simulating the activities of a human user of the Internet may allow for more relevant search results as they concern how such references would be presented to a user of the Internet.

The method 700 further includes constructing 720 a reverse index of the results. For example, a reverse index can be constructed 720 that references the online references to the entity and ranks them according to a set of predetermined criteria. Constructing 720 a reverse index can optionally include performing a trend analysis. A trend analysis shows how the online references have changed over time. For instance, the chart 605 of FIG. 6A shows how the organic ranks of a client Web page, a first competitor's Web page, and a second competitor's Web page have changed over time. As such, the data included in the chart 605 of FIG. 6A may be representative of a particular type of trend analysis.

Constructing 720 a reverse index can alternately or additionally include generating an SEO score. The SEO score allows a user, such as the customer that requested the index, to see the relevance of the references based on one or more predetermined criteria, e.g., cost-effectiveness.

In some embodiments, the method 700 may be performed using a system, such as the system described in FIG. 1. The modules, or individual components, of a system used to perform the method can be implemented in hardware, software or any combination thereof. If implemented in software, the modules of the system are stored in a computer-readable medium, to be accessed as needed to perform their functions. Additionally, if implemented in software, the tasks assigned to each module can be carried out by a processor, field-programmable gate array (FPGA) or any other logic device capable of carrying out software instructions or other logic functions.

The embodiments described herein may include the use of a special purpose or general purpose computer including various computer hardware and/or software modules, as discussed in greater detail below.

Embodiments within the scope of the present invention may also include physical computer-readable media and/or intangible computer-readable media for carrying or having computer-executable instructions or data structures stored thereon. Such physical computer-readable media and/or intangible computer-readable media can be any available media that can be accessed by a general purpose or special purpose computer. By way of example, and not limitation, such physical computer-readable media can comprise RAM, ROM, EEPROM, CD-ROM or other optical disk storage, magnetic disk storage or other magnetic storage devices, or any other physical medium which can be used to carry or store desired program code means in the form of computer-executable instructions or data structures and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions comprise, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer-readable program code stored thereon, the computer-readable program code comprising computer-executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for indexing online references of an entity, the method comprising:
   identifying an entity, wherein the entity is an individual, corporation, brand, or product;
   identifying one or more channels of the Internet to be searched for references to the entity;
   identifying one or more types of signals to be evaluated within each of the one or more channels, the one or more types of signals including one or more of a frequency of a reference to the entity on a Web Page included in the one or more of the channels and a location of the reference to the entity on the Web Page;
   crawling the channels of the Internet, using a crawler, to look for and to locate references to the entity after the entity is identified for the crawler, wherein crawling the channels of the Internet comprises:

searching the one or more channels of the Internet that are publically available to look for and to locate references to the entity;

searching the one or more channels of the Internet that are publically available to look for and to locate one or more signals of the one or more identified signal types, the one or more signals relating to and including information about the located references to the entity; and evaluating the one or more signals after the one or more signals are located by the crawler; and constructing a reverse index of the references to the entity, wherein the reverse index is based on each channel in which a reference to the entity is located and the one or more signals evaluated for the located reference to the entity.

2. The method according to claim 1, wherein the located references to the entity include one or more of: online advertisements, news items, and organic references associated with the entity.

3. The method according to claim 1, further comprising compiling a search engine optimization score based on the reverse index.

4. The method according to claim 1, further comprising compiling an advertisement score based on the reverse index.

5. The method according to claim 1, wherein the entity to be indexed is identified based on a customer request.

6. The method according to claim 1, wherein one or more of the following channels are searched: organic searches, page searches, linked advertisement networks, banner advertisements, contextual advertisements, e-mail, blogs, social networks, social news, affiliate marketing, mobile advertisements, media advertisements, video advertisements, discussion forums, news sites, rich media, social bookmarks, paid searches, and in-game advertisements.

7. The method according to claim 1, wherein crawling the channels of the Internet further comprises simulating activities of a human user of the Internet.

8. The method according to claim 7, wherein simulating the activities of a human user of the Internet comprises mimicking or providing as input at least one attribute associated with a human user of the internet, the at least one attribute including one or more of: a geographic location, a time of browsing, an age, an income level, or an e-mail address.

9. The method according to claim 1, wherein constructing a reverse index further comprises performing a trend analysis of the located references to the entity.

10. A method of search engine optimization, the method comprising:

identifying an entity, wherein the entity is an individual, corporation, brand, or product;

identifying one or more channels of the Internet to be searched for references to the entity;

identifying one or more types of signals to be evaluated within one or more of the channels, the one or more types of signals including one or more of a frequency of a reference to the entity on a Web Page included in the one or more of the channels and a location of the reference to the entity on the Web Page;

crawling the channels of the Internet, using a crawler, to look for and to locate references to the entity after the entity is identified for the crawler, wherein crawling the channels of the Internet comprises:

searching the one or more channels of the Internet that are publically available to look for and to locate references to the entity;

searching the one or more channels of the Internet that are publically available to look for and to locate one or more signals of the one or more identified signal type, the one or more signals relating to and including information about the located references to the entity; and evaluating the one or more signals after the one or more signals are located by the crawler.

11. The method of claim 10, further comprising constructing a reverse index of the located references to the entity, wherein the reverse index is based on each channel in which a located reference to the entity is identified and the one or more signals evaluated for the located reference to the entity.

12. The method of claim 11, wherein the searching the one or more channels comprises searching using a keyword.

13. The method of claim 12, further comprising identifying an organic rank for one of the located references to the entity, which is located by searching using the keyword, based on the evaluated one or more of the signals.

14. The method of claim 10, wherein crawling the Internet further comprises simulating activities of a human user of the Internet.

15. A method of search engine optimization, the method comprising:

identifying an entity, wherein the entity is an individual, corporation, brand, or product;

identifying one or more organic search result channels of the Internet to be searched for a reference to the entity;

identifying one or more types of signals to be evaluated within one or more of the organic search result channels, the one or more types of signals including one or more of a frequency of the reference to the entity on a Web Page included in the one or more of the organic search result channels and a location of the reference to the entity on the Web Page;

crawling the organic search result channels of the Internet, using a crawler, to look for and to locate references to the entity after the entity is identified for the crawler, wherein crawling the organic search result channels of the Internet comprises:

searching the one or more organic search result channels of the Internet that are publically available to look for and to locate references to the entity;

searching the one or more organic search result channels of the Internet that are publically available to determine a rank of one or more of the located references to the entity and to locate one or more signals of the one or more identified signal types, the one or more signals relating to and including information about the located references to the entity; and evaluating the one or more signals after the one or more signals are located by the crawler.

16. The method of claim 15, further comprising constructing a reverse index of the located references to the entity, wherein the reverse index is based on the one or more signals evaluated for the located references to the entity.

17. The method of claim 16, further comprising compiling a search engine optimization score based on the reverse index.

* * * * *